May 11, 1971   L. C. ARNOLD ET AL   3,578,407
HIGH-PRESSURE CLOSURE APPARATUS
Filed Oct. 14, 1968   3 Sheets-Sheet 3

INVENTOR.
Lloyd C. Arnold
George A. Mortimer
BY

AGENT

3,578,407
HIGH-PRESSURE CLOSURE APPARATUS
Lloyd C. Arnold, Texas City, and George A. Mortimer, La Marque, Tex., assignors to Monsanto Company, St. Louis, Mo.
Filed Oct. 14, 1968, Ser. No. 767,079
Int. Cl. B65d 25/54; G01f 23/02
U.S. Cl. 23—252      12 Claims

ABSTRACT OF THE DISCLOSURE

An apparatus for use in high pressure applications comprising a solid body having a partially ellipsoidal shape, said solid body being of a material having high compressive strength and low tensile strength and a means for uniformly supporting said body. The apparatus is especially suitable as a window and a support for said window which can be mounted in a reaction vessel for visual observation of very high pressure chemical reactions.

BACKGROUND OF THE INVENTION

The present invention relates to an apparatus for use in high pressure applications. More particularly, the present invention relates to a viewing window and a mounting therefor for use in high pressure reaction vessels and the like.

In studying the kinetics, rate constants, etc., of chemical reactions, it is often necessary to have a means for viewing the reaction medium in order that spectroscopic measurements and the like may be conducted. It is also desirable, in many cases, to be able to merely observe the reaction medium so that any color or other visual changes may be recorded. The ability to visually follow reactions at very high pressures is severely curtailed by the fact that most transparent materials are not capable of withstanding the high pressures encountered unless they are extremely thick because they have such low ultimate tensile strength. Furthermore, even though extremely thick windows are sometimes used, extremely high pressures still tend to cause fracturing and/or shattering of the windows with the result that high pressures cannot be attained and a severe safety problem is imposed.

SUMMARY OF THE INVENTION

It is, therefore, an object of the present invention to provide an apparatus for use in high pressure applications.

It is a further object to provide a way of using low tensile strength materials in high pressure applications in order to take advantage of their other desirable properties.

It is a still further object of the present invention to provide a window and a support means therefor for use in high pressure applications, which windows can be made relatively thin.

These and other objects of the present invention which will be apparent from the description herein, drawings and the appended claims can be accomplished by an apparatus comprising a solid body of a material having a practical ultimate tensile strength of less than 125,000 p.s.i. and a compressive strength at least 10 times greater than its tensile strength, at least a portion of said body having an approximately ellipsoidal shape, said portion of said body possessing said ellipsoidal shape corresponding substantially to the solid of rotation obtained by rotating about the major axis at least the portion of an ellipse lying between a latus rectum and a point where a line parallel to said latus rectum and at least two-thirds of the perpendicular distance from said latus rectum to the minor axis of said ellipse intersects said ellipse, said ellipse having an eccentricity of at least 0.25 and means for uniformly supporting said body adjacent the periphery of a cross-sectional area of said body determined by passing a plane through said body perpendicular to a line of said body corresponding to the major axis of said ellipse, said plane passing through said body at a distance from the minor axis of said ellipse corresponding to about at least the distance between the minor axis and the latus rectum.

DESCRIPTION OF THE PREFERRED EMBODIMENTS

The concepts described herein can, of course, be applied to the fabrication and use of any component for high-pressure work wherein a material of compressive strength at least 10 times greater than its tensile strength and a tensile strength of less than 125,000 p.s.i. is used. For purposes of facilitating description of the invention only, however, the description will be limited to high-pressure window systems.

It is necessary in practicing the present invention that at least a part of the solid body, e.g., the window, has a shape which approximates at least part of an ellipsoid. The ellipsoidal portion of the body should conform substantially to at least the portion of an ellipsoid obtained by rotating about its major axis the part of an ellipse lying between a latus rectum and a point where a line parallel to said latus rectum and at least two-thirds of the perpendicular distance from said latus rectum to the minor axis of said ellipse intersects said ellipse. In choosing the proper ellipsoidal shape of the body, the ellipse used as the basis of the meaurement should have an eccentricity of at least 0.25 and preferably of at least 0.50, where the eccentricity is defined as the distance from the minor axis to the latus rectum divided by the distance from the minor axis to the vertex of the ellipse. In general, the higher the eccentricity, the higher the pressure that can be withstood by the window.

Figure 1:
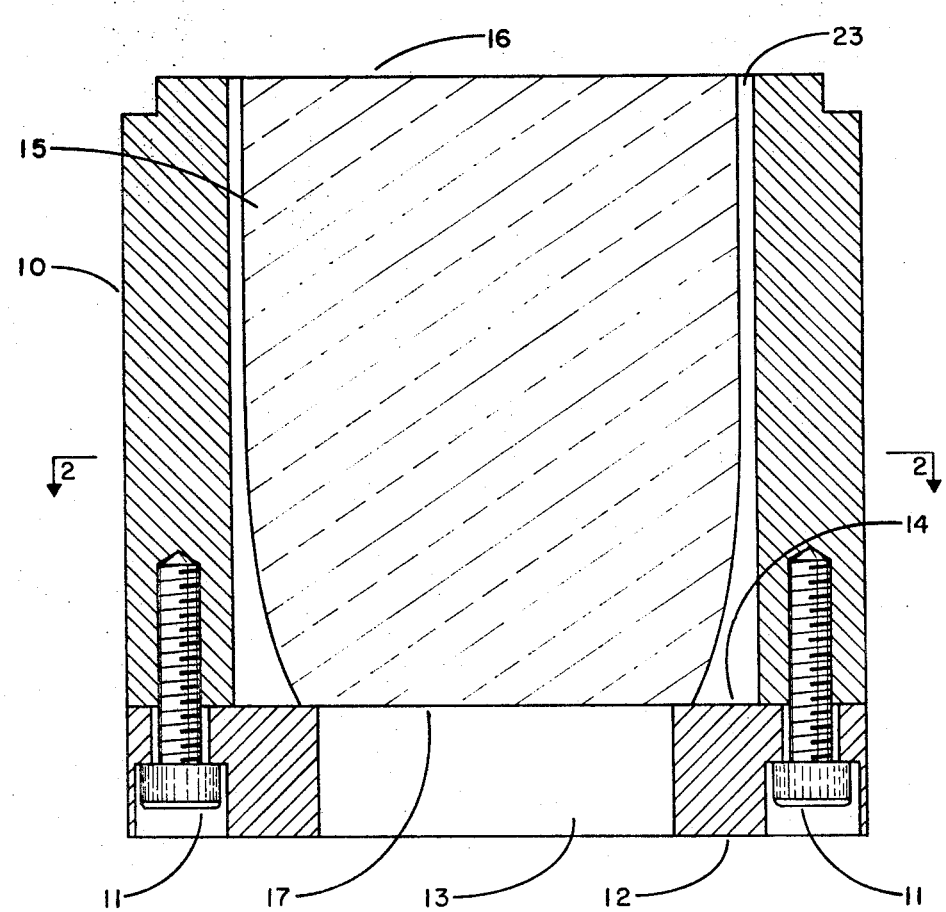
FIG. 1 is an elevational cross-sectional view of one embodiment of the present invention.
Figure 2:
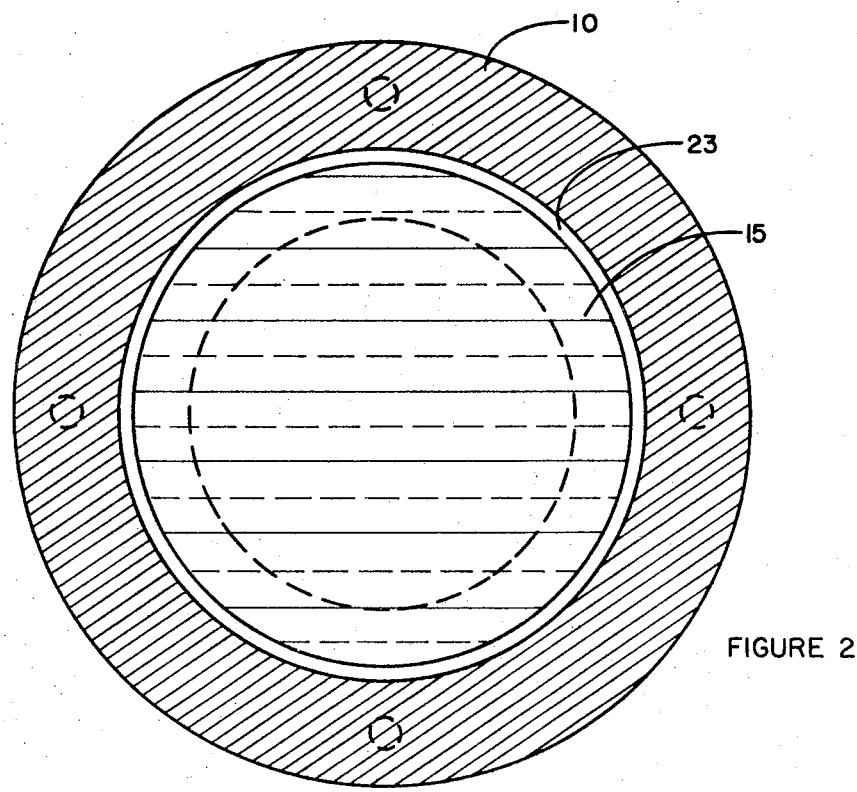
FIG. 2 is a sectional view taken along line 2—2 of FIG. 1.

The invention can be better understood by reference to the accompanying figures. It should be pointed out that the apparatus need not be operated in the position shown in FIG. 1 so that any reference herein to upper or lower is only relative to the apparatus as shown in the figure. Referring now to FIGS. 1 and 2, there is shown cylindrical housing 10 removably attached by bolts 11 to flat flange 12. Opening 13 in flange 12 has a smaller diameter than the internal diameter of housing 10 thus forming shoulder 14 at the point where the inside of housing 10 meets flange 12. In the embodiment of FIG. 1, window 15 is comprised of a cylindrical portion and an ellipsoidal shaped portion adjoined to one another. It is to be understood that when reference is made to the cylindrical portion and the ellipsoidal shaped portion being adjoined to one another, that this is a manner of describing the shape of window 15 and is not intended to indicate that window 15 comprises two separable sections. As can be seen from FIG. 1, the cylindrical portion consists of the upper part of window 15 whereas the ellipsoidal section comprises the lower part, i.e., the part adjacent flange 12, line 2—2 forming, for purposes of illustration, the approximate dividing line between said two portions. Window 15 also has planar faces 16 and 17, planar face 17 corresponding to a plane passing through the latus rectum and perpendicular to the major axis of the ellipse which forms the basis of the measurements, whereas planar face 16 is formed by one end of the cylindrical portion of window 15. The diameter of the cylindrical portion of window 15 is slightly less than the internal diameter of cylindrical housing 10 thus forming an annular space 23 between window 15 and housing 10. The periphery of face 17 is uniformly contacted by shoulder 14 of flange 12.

Figure 3:
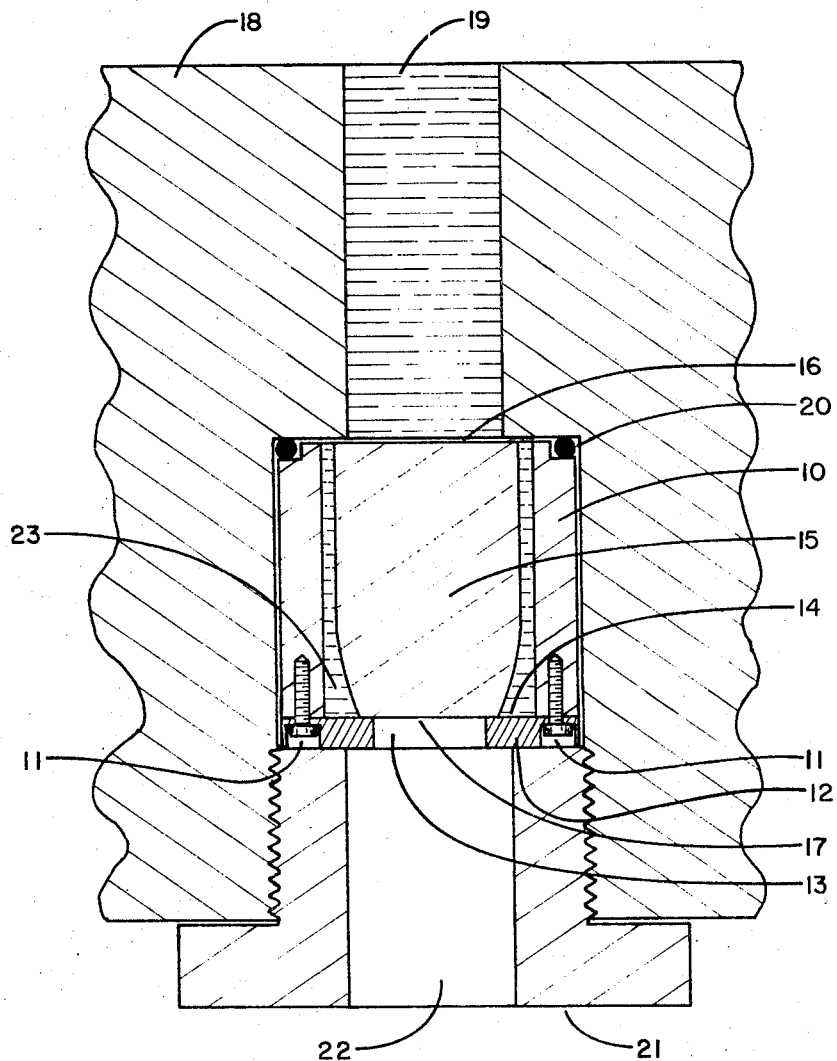
FIG. 3 is a sectional view of the apparatus of FIG. 1 installed in a reaction vessel.

Turning now to FIG. 3 for a description of a use of the apparatus of FIG. 1, housing 10 attached to flange 12 and supporting window 15 is fitted into the wall 18 of a high pressure vessel. O-ring 20 held between housing 10 and reactor vessel wall 18 by pressurizing medium 19 serves to cause a pressure seal preventing the escape of pressurizing medium 19 which can be liquid or gas. The position of this O-ring may vary, and additional O-rings may be used to seal pressure at flange 12 if desired. A retaining bolt 21 having a central opening 22 is threaded into wall 18 of the pressure vessel and serves to hold the apparatus comprising housing 10, window 15 and flange 12 securely in place. When used in this manner, it is apparent that planar face 17 is exposed to atmospheric pressure whereas the remaining surfaces of window 15 are completely immersed in pressurizing medium 19, the annular space 23 lying between the surface of window 15 and the internal wall of housing 10 allowing pressurizing medium 19 to completely submerge window 15 except for face 17. The pressure exerted by medium 19 forces window 15 against shoulder 14 of flange 12 thus tending to form a seal between flange 12 and planar face 17.

Figure 4:
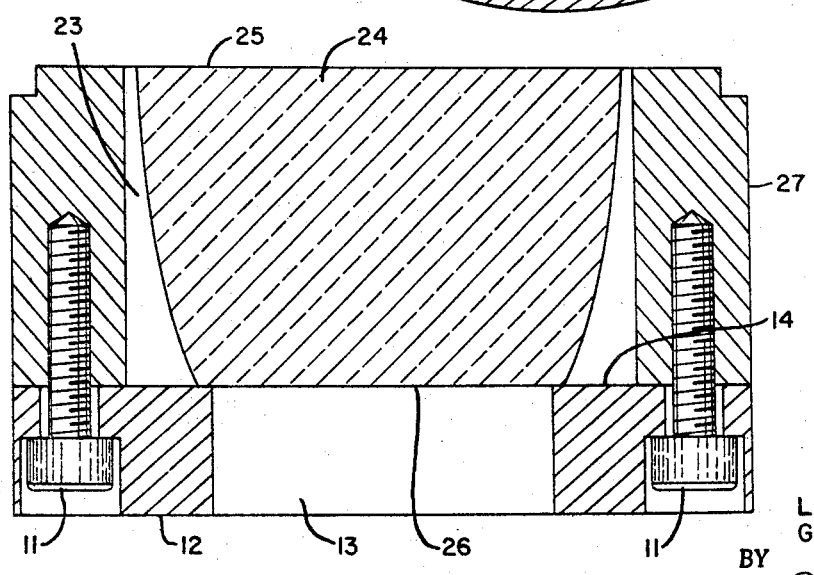
FIG. 4 is an elevational cross-sectional view of another embodiment of the present invention.

In FIG. 4 is shown another preferred modification of the present invention wherein window 24 consists entirely of a part of an ellipsoidal shaped body having no cylindrical section. In the embodiment of FIG. 4, planar face 25 is determined by a plane passing through a line in the window corresponding to the minor axis of and perpendicular to the major axis of the ellipse which forms the basis of the measurements and to which the window conforms. Here, as in the window of FIG. 1, planar face 26 corresponds to a plane through the latus rectum perpendicular to the major axis. The support means for the window of FIG. 4 is identical to that of the window of FIG. 1 except that cylindrical housing 27 has a length which corresponds to the size of window 24.

While it is preferred that the ellipsoidal portion of the windows constitute at least the entire portion of the ellipsoid lying between the latus rectum and the minor axis, it is not absolutely necessary. However, it should conform at least to the part of an ellipsoid lying between the latus rectum and at least two-thirds of the perpendicular distance to the minor axis. Also, it is preferable in the case of windows having cylindrical portions that the diameter of the cylindrical portion equal the diameter of the circular cross-section of the window where the cylindrical portion and the ellipsoid shaped portion are adjoined. In an especially preferred embodiment of the window having a cylindrical portion wherein the diameter of the cylindrical portion equals the diameter of the circular cross-section of the window where the cylindrical and the ellipsoidal shaped portion are adjoined, the cylindrical portion has a diameter equal to the length of a line in the ellipsoidal shaped portion corresponding to the minor axis of the ellipse used as the basis for measurement.

In the preferred embodiment wherein the window contains a cylindrical portion, the length or diameter of the cylindrical section is not critical, but will depend on the particular use to which the window is put, the pressure exerted, etc.

It is to be understood that the two embodiments of the present invention shown in FIGS. 1 and 4 are but preferred modifications only. The shape of the window excluding the ellipsoidal portion is not critical and can be irregularly shaped. For example, the entire body comprising the window can form an ellipsoidal shaped body. The only requirement is that at least a portion of the window conform to the ellipsoidal shape set out above. In cases, for example, the embodiments of FIGS. 1 and 4, wherein the window has two planar faces, it is preferred that the faces be parallel.

While it is necessary in practicing the present invention that at least a part of the solid body, e.g., the window, have a shape which approximates at least part of an ellipsoid, it is not necesary that the shape be exactly that of an ellipsoid. It is only necessary that this shape be approached. It is well known to those skilled in the art that the contour of an ellipse lying between a latus rectum and the minor axis of said ellipse may be satisfactorily approximated by the arcs of two circles of different radii, by a portion of parabola plus the arc of a circle, by a portion of a hyperbola plus the arc of a circle, or by portions of other geometrical curves as represented by the French curves of a draftsman. The exact portions of various geometric curves or radii to describe arcs will vary depending on the eccentricity of the ellipse which is being approximated by these curve-fitting or curve-approximating procedures.

The exact method of obtaining a substantially ellipsoidal contour is not important as long as a substantially ellipsoidal contour is obtained and many methods are known by those skilled in the art. For example, a suitable window can be fabricated by cutting part of two circular contours on one end of a glass cylinder in the following manner. Using normal glass grinding techniques, a circular contour is ground onto one end of a glass cylinder, the radius of the contour being greater than and at right angles to the radius of the cylinder and the contour located such that one end of the circular arc intersects the flat end of the cylinder at an angle and the other end is substantially tangent to the circumference or periphery of the cylinder. This first circular contour is then modified by grinding onto it a second circular contour such that the second contour intersects the flat end of the cylinder at a more acute angle than the first circular contour and the opposite end of the second circular arc intersects the arc of the first circular contour at a tangent, the radius of the second circular contour being less than and at right angles to the radius of the cylinder. If the two radii characterizing the two circular contours have been properly chosen, the ground portion of the window will satisfactorily approximate a section of a solid ellipse of rotation as hereinbefore described.

The particular method of fabricating a solid body containing a substantially ellipsoidal shape as hereinbefore described is not important. Any convenient fabricating technique such as grinding, cutting, chipping, molding, polishing, etc., may be used as long as the finished body has a substantially ellipsoidal shape as hereinbefore described. It is preferable that chips, cracks, scratches, ridges, and other like fabrication imperfections in the solid body, which do not lie substantially along a line lying in a plane passing through the major axis of the ellipse be absent or held to a minimum. Said imperfections which do lie in a plane or series of planes passing through the major axis of what is conceptually a solid ellipse of rotation, such as might arise from certain chipping operations or as flashings or mold marks from molding operations, do not appear to weaken the body and may be tolerated.

The support used for the body, e.g., the window, must be of such a design that the body is supported adjacent the periphery of a cross-sectional area of the window determined by passing a plane through the body perpendicular to a line of the window corresponding to the major axis of the ellipse which forms the basis for the measurement, said plane being passed through said body at a distance from the minor axis of said ellipse corresponding to about at least the distance between the minor axis and the latus rectum of the ellipse used as the basis of measurement. In the embodiment shown in FIGS. 1 and 4, the window is seen as supported adjacent the planar face passing through the latus rectum. While it is preferred that the body, e.g., the window, be supported at the periphery of a cross-sectional area passing about through the latus rectum, that is, of course, not necessary. However, in no event should the window be supported at the periphery of a cross-sectional area lying closer to the minor axis than about the distance between the latus rectum and the minor axis though it can be supported at a greater distance. Also, as will be recognized, the support means could be machined such that the window would be supported on the ellipsoidal surface adjacent a cross-sectional area passing about through the latus rectum rather than on the periphery of the planar face. In other words, the support means could form somewhat of a socket with the smaller end of the ellipsoid shaped portion fitting into it. Whatever the design of the support means, it is necessary that it be such that when the apparatus is in use in a pressurized system substantially all of the window save the portion lying beyond the latus rectum, i.e., toward the vertex, be subjected to the pressurizing medium. In this regard, it is seen that the preferred support means shown in FIGS. 1 and 4 are designed such that the internal diameter of the cylindrical housing slightly exceeds the diameter of the cylindrical portion of the window of FIG. 1 or the diameter of the maximum cross-sectional area of the window of FIG. 4 such that when the windows are fitted into the housing, annular space 23 is formed between the internal walls of the cylindrical housing and the surface of the window. This, of course, allows the pressurizing medium to surround the window except for the planar face which is exposed to the atmosphere. Grooves may be cut on the inside surface of housing 10 to facilitate flow of a viscous pressurizing medium if annular space 23 is minimal. The most critical element in the design of the support means is that the window be uniformly contacted adjacent the periphery of the cross-sectional area, as defined above, passing through the body. For convenience, it is preferable that the support for the window be similar to that shown in FIGS. 1 and 4 for the reason that with the proper lapping and grinding, the flange on which the planar face passing through the latus rectum rests and said planar face can be made flat to within ½ to 3 wave bands thus insuring exact mating of the support to the window, effecting a near-perfect pressure seal and providing uniform support. If desired, a gasket material may be placed between the support and the window, however, such is not necessary if proper mating as above is accomplished. Also, O-rings may be used to effect a pressure seal of the window to the flange. The material of construction of the support is relatively unimportant provided it possesses adequate tensile strength. Practically any metal used in constructing pressure vessels is satisfactory. Furthermore, although the end of the windows in FIGS. 1 and 4 is seen to be approximately flush with the end of the cylindrical housing, this is not absolutely necessary though it is preferred. Although the preferred supports shown herein are of two-piece construction, it is obvious that the flange and housing could be incorporated into a single piece.

The material used for construction of the window could naturally be of any type. However, the concept of the present invention is that materials having very high compressive strength but low tensile strength can be made to be acceptable components in high pressure applications. In practice, pressure vessels and the like are generally fabricated from steels having a practical ultimate tensile strength in excess of 125,000 p.s.i. certainly in excess of 50,000 p.s.i., and perhaps, as high as 280,000 p.s.i. Materials of construction having tensile strengths less than 125,000 p.s.i., such as cast iron, plastics, glass, etc., are not normally used because the tensile stresses created by the pressure cause failure of components made from such low-tensile strength materials. The concept of the present invention is that by the use of a component having an ellipsoidal shape and means for supporting said component uniformly as described above, tensile stresses in general, and more especially localized or point tensile stresses, are virtually eliminated or at least kept to a minimum. Thus, materials of construction having low tensile strengths can be used for fabricating pressure-resistant components such as windows, plugs, entry or exit ports, orifices, valve seats, etc., even though said materials are wholly unsatisfactory for fabricating pressure vessels.

By tensile strength, ultimate tensile strength, or practical tensile strength is meant the tensile force which must be applied to a specimen of the material which will be used in fabrication of a pressure component in order to cause the specimen to break. Theoretical or calculated tensile strengths are not implied. Also not implied are tensile strengths measured on single crystals or ultrapure fibers or whiskers of the parent material. For example, glass has a theoretical tensile strength of about 3,000,000 p.s.i. A value of about 1,000,000 p.s.i. has been measured for special glass fibers. Values of up to 10,000 p.s.i. can be measured for specially prepared large glass specimens. However, glass specimens normally obtainable, and even said specially prepared specimens after normal handling, give measured tensile values in the range of 1000 to 4000 p.s.i. Tensile strength as construed herein would be understood to be 1000 to 4000 p.s.i. for glass, the value measured on the actual material used for making glass windows.

In general, the material used for the window will have a compressive strength at least 10 times greater than its tensile strength. By compressive strength is meant the maximum hydraulic force which can be applied uniformly over the entire surface of a material before an irreversible, sudden change in dimensions takes place. Examples of materials which undergo such changes at high pressures include wood, bone, ice, bismuth, and the like.

Since one of the prime purposes of the invention is to provide window structures for visual observations in high pressure applications, it is preferred that a transparent material be used for the window. Practically any solid material which is transparent to the wave length of light to be used is suitable. Nonlimiting examples of such material include quartz, glass, ruby, diamond, sapphire, transparent polymeric materials such as polyacrylics, polystyrenes, etc. Windows made of glass are especially preferred. It is to be understood, however, that other materials which are non-transparent, can be used for other applications such as orifices, valve seats, plugs, etc., as, for example, metal carbides which also exhibit high compressive strength and low tensile strength. In particular, it should be pointed out that materials which will not transmit visible light but which will transmit infrared radiation are to be included within the scope of this invention. Among such materials are the selenium glasses, thallium-containing infrared windows and the like.

The advantages of the present invention are demonstrated by the following examples. In the experiments described herein, the windows and supports were mounted in a small pressure vessel in a manner similar to that shown in FIG. 3. Kerosene was employed as the pressurizing medium and pressure was obtained by the use of a Model 46–3700 Amico air driven pump.

EXAMPLE 1

The window used in this example was a cylinder of annealed pyrex having a diameter of 2 in. and a length of 2 in. When mounted in the support, the unsupported area of the face exposed to atmospheric pressure, i.e., the end of the cylinder adjacent the flange, had a diameter of 1¼ in. The pressure in the system was rapidly raised to 40,000 p.s.i. After approximately 5 seconds, the window failed releasing the pressurizing medium.

EXAMPLE 2

The window used in this example had a cylindrical section of diameter 2 in. adjoined to the base of a frustro-conical section which had a base diameter of 2 in. The diameter of the end surface of the window formed by the frustro-conical section was 1$^{25}$/$_{32}$ in. The length of the window, i.e., the distance from one end surface to the other, was 1.7 in., the length of the frustro-conical section being 9/16 in. When the window was placed in the support with the end surface formed by the frustro-conical section against the flange, the unsupported area of the surface exposed to atmosphere pressure had a diameter of 1½ in. The system was pressured to 40,000 p.s.i., held there briefly, and the pressure was then released. The window suffered severe internal cracks indicative of incipient failure.

EXAMPLE 3

In this example, a window very similar to that of FIG. 1, i.e., having a cylindrical section adjoined on one end to an ellipsoidal section was employed. The ellipsoidal section corresponded to the portion of an ellipsoid formed by rotating about its major axis that part of an ellipse of eccentricity 0.54 lying between the latus rectum and the minor axis. The minor axis was 2 in. in length and the latus rectum 1$^{11}$/$_{16}$ in. in length. The cylindrical section had a diameter of 2 in. and a length of about ⅝ in. The overall thickness of the window was 1¼ in. The face exposed to atmospheric pressure, i.e., the face corresponding to a plane through the latus rectum, when supported by the flange had an unsupported area with a diameter of 1½ in. Pressure on the window was raised to 40,000 p.s.i., held there briefly and then released. The window was found to be undamaged. The system was then repressured to 40,000 p.s.i. and the pressure rapidly cycled between 37,000 p.s.i. and 43,000 p.s.i. for five minutes at which time the pressure was released. The window was still undamaged. The window was then pressured to 45,000 p.s.i. and held for 90 minutes under pressure. The pressure was quickly released and the window examined. Only slight surface cracks appeared on the face of the window where the glass was in contact with the flange. No internal cracks or strain within the window were noted.

As can be seen from the above examples, the apparatus of the present invention wherein the window possesses a partially ellipsoidal shape is vastly superior to other designs. Whereas pressures not exceeding 50,000 p.s.i. were employed herein, the use of the apparatus is not so limited but can be used at practically any pressure provided factors such as proper thickness of the window, matching of the windows and supports, eccentricity of the ellipse, etc., are considered.

Although the description given herein has been confined to the use of the apparatus in high-pressure reaction vessels for purposes of simplicity, it is obvious that the apparatus is well suited for other applications. For example, the apparatus has wide application in the field of underwater studies such as for use as windows in bathyspheres, submarines and other underwater devices.

What is claimed is:

1. A closure apparatus for use in high pressure applications comprising:
    (a) a rigid wall member having a high pressure side and a low pressure side, said wall member containing an aperture,
    (b) A solid body of a material having a compressive strength at least 10 times greater than its tensile strength, at least a portion of said body having an approximately ellipsoidal shape, said portion of said body corresponding substantially to the solid of rotation obtained by rotating about the major axis at least the portion of an ellipse lying between a latus rectum and a point where a line parallel to said latus rectum and at least two-thirds of the perpendicular distance from said latus rectum to the minor axis of said ellipse intersects said ellipse, said ellipse having an eccentricity of at least 0.25, said solid body being mounted in said aperture of said rigid wall member in such relationship that the latus rectum of said ellipsoidal shape is toward the low pressure side of said rigid wall member and said solid body being of such size that there is an annular space surrounding the sides of said solid body, said solid body being in open communication with the high pressure side of said rigid wall member, and
    (c) rigid sealing means bearing against said solid body adjacent the periphery of a cross-sectional area of said solid body determined by passing a plane through said body perpendicular to a line of said body corresponding to the major axis of said ellipse, said plane being passed through said body at a distance from the minor axis of said ellipse corresponding to about at least the distance between the minor axis and the latus rectum, said rigid sealing means being rigidly attached to said low pressure side of said rigid wall member to retain said solid body within said aperture.

2. The apparatus of claim 1 wherein said material is transparent.

3. The apparatus of claim 2 wherein said material is chosen from the class consisting of glass, quartz, ruby, diamond, sapphire, and transparent polymeric materials.

4. The apparatus of claim 3 wherein said material is glass.

5. The apparatus of claim 4 wherein said solid body has a first planar face and a second planar face, said first planar face and said second planar face being parallel, said first planar face determined by a plane passing through a line in said solid body corresponding to said latus rectum and perpendicular to a line in said solid body corresponding to said major axis, said solid body being supported adjacent the periphery of said first planar face.

6. The apparatus of claim 5 wherein said second planar face is determined by a plane passing through a line in said solid body corresponding to the minor axis of said ellipse and perpendicular to a line of said body corresponding to the major axis of said ellipse.

7. The apparatus of claim 6 wherein said eccentricity is at least 0.50.

8. The apparatus of claim 7 wherein said rigid sealing means comprises a hollow cylindrical housing having an internal diameter greater than the diameter of said second planar face, said housing removably attached to a flat flange having a circular opening therein, the diameter of said opening being less than the diameter of said first planar face, said opening and said cylindrical housing being coaxial, said solid body being removably mounted in said cylindrical housing such that the outer edge of said first planar face contacts said flange.

9. The apparatus of claim 5 wherein said solid body has a cylindrical portion, said cylindrical portion and said first planar face being coaxial, one end of said cylindrical section being said second planar face, the diameter of said cylindrical section being equal to the diameter of the circular cross-section of said solid body where said cylindrical portion and said portion of said solid body having an approximately ellipsoidal shape are adjoined.

10. The apparatus of claim 9 wherein said eccentricity is at least 0.50.

11. The apparatus of claim 10 wherein the diameter of said cylindrical portion is equal to the length of a line in the ellipsoidal portion of said solid body corresponding to said minor axis.

12. The apparatus of claim 11 wherein said rigid sealing means comprises a hollow cylindrical housing having an internal diameter greater than the diameter of said cylindrical portion, removably attached to a flat flange having a circular opening therein, the diameter of said opening being less than the diameter of first planar face, said opening and said cylindrical housing being coaxial, the length of said cylindrical housing being substantially equal to the distance between said first and second planar faces, said solid body being removably mounted in said cylindrical housing such that the outer edge of said first planar face contacts said flange.

References Cited

UNITED STATES PATENTS

| | | | |
|---|---|---|---|
| 1,142,262 | 6/1915 | Mendenhall | 220—82 |
| 2,357,753 | 9/1944 | Matvszak | 23—252 |
| 3,014,981 | 12/1961 | Appl | 116—117X |

JAMES H. TAYMAN, Jr., Primary Examiner

U.S. Cl. X.R.

23—290; 73—323, 331, 330; 220—46, 82; 350—319; 122—6.5